United States Patent
Carton et al.

(10) Patent No.: US 9,663,219 B2
(45) Date of Patent: May 30, 2017

(54) METHOD AND SYSTEM FOR CONTROLLING THE FLIGHT OF AN AIRCRAFT

(71) Applicant: Airbus Operations S.A.S., Toulouse (FR)

(72) Inventors: Mathieu Carton, Toulouse (FR); Pierre Debusschere, Lias (FR); David Chabe, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 14/807,014

(22) Filed: Jul. 23, 2015

(65) Prior Publication Data

US 2016/0023749 A1 Jan. 28, 2016

(30) Foreign Application Priority Data

Jul. 24, 2014 (FR) .................................... 14 57145

(51) Int. Cl.
*B64C 13/00* (2006.01)
*B64D 39/00* (2006.01)
*G05D 1/08* (2006.01)
*G05D 1/06* (2006.01)

(52) U.S. Cl.
CPC .............. *B64C 13/00* (2013.01); *B64D 39/00* (2013.01); *G05D 1/0607* (2013.01); *G05D 1/0808* (2013.01)

(58) Field of Classification Search
CPC .. G05D 1/0066; G05D 1/0808; G05D 1/0607; G05D 1/00; G05D 1/0055; G05D 1/0623; G05D 1/0661; G05D 1/0825; G05D 1/101; G01C 23/00; G01C 23/005

See application file for complete search history.

(56) References Cited

U.S. PATENT DOCUMENTS

| | | | | | |
|---|---|---|---|---|---|
| 2,958,483 | A | * | 11/1960 | McRuer | G05D 1/0808 244/181 |
| 2,973,926 | A | * | 3/1961 | Chang | G05D 1/0808 244/191 |
| 3,082,979 | A | * | 3/1963 | Hendrick | G05D 1/0808 244/196 |
| 3,399,849 | A | * | 9/1968 | Hendrick | G05D 1/0825 244/183 |
| 3,653,612 | A | * | 4/1972 | Palfreyman | G01L 5/221 244/236 |
| 3,658,280 | A | * | 4/1972 | McDonnell | G05D 1/0607 244/180 |

(Continued)

OTHER PUBLICATIONS

French Patent Office, French Search Report for French Patent Application No. 1457145 mailed Jun. 19, 2015.

*Primary Examiner* — Nicholas Kiswanto
*Assistant Examiner* — Kenny A Taveras
(74) *Attorney, Agent, or Firm* — Lorenz & Kopf, LLC

(57) ABSTRACT

The system comprises at least one lift generator element that is able to modify directly the lift of the aircraft and means for defining a deflection instruction upon actuation by a pilot of the aircraft of a control column of the aircraft generating a vertical load factor control value and applying it to an elevator and simultaneously defining a command instruction and applying it to the lift generator element to generate a direct lift.

20 Claims, 2 Drawing Sheets

(56) References Cited

U.S. PATENT DOCUMENTS

| | | | | |
|---|---|---|---|---|
| 4,261,537 A * | 4/1981 | Frosch | ................ | G05D 1/0607 |
| | | | | 244/181 |
| 4,617,633 A * | 10/1986 | McAllister | ........... | G05D 1/0623 |
| | | | | 244/181 |
| 4,825,375 A * | 4/1989 | Nadkarni | ............. | G05D 1/0607 |
| | | | | 244/178 |
| 5,722,620 A * | 3/1998 | Najmabadi | ............. | B64C 13/16 |
| | | | | 244/181 |
| 6,332,105 B1 * | 12/2001 | Calise | .................. | G05D 1/0825 |
| | | | | 244/195 |
| 2011/0004361 A1 * | 1/2011 | Goupil | .................... | B64C 13/16 |
| | | | | 701/3 |
| 2012/0318929 A1 * | 12/2012 | Golling | ................. | B64D 39/00 |
| | | | | 244/203 |
| 2013/0197725 A1 * | 8/2013 | O'Dell | ................ | H04L 67/125 |
| | | | | 701/14 |
| 2016/0023749 A1 * | 1/2016 | Carton | .................... | B64C 13/00 |
| | | | | 701/4 |
| 2016/0122000 A1 * | 5/2016 | Mahmulyin | ............ | B64C 13/16 |
| | | | | 244/230 |

\* cited by examiner

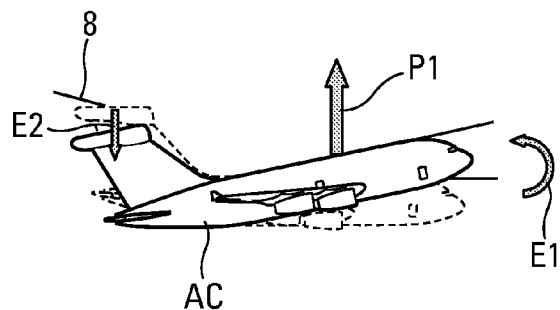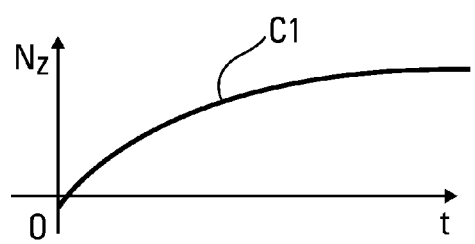
Fig. 2A        Fig. 2B
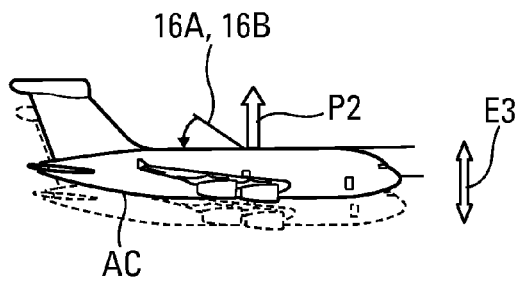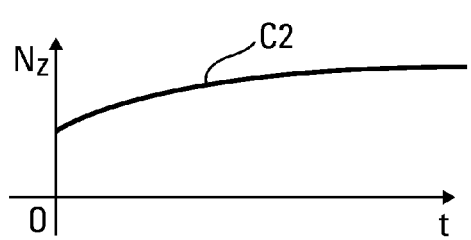
Fig. 3A        Fig. 3B
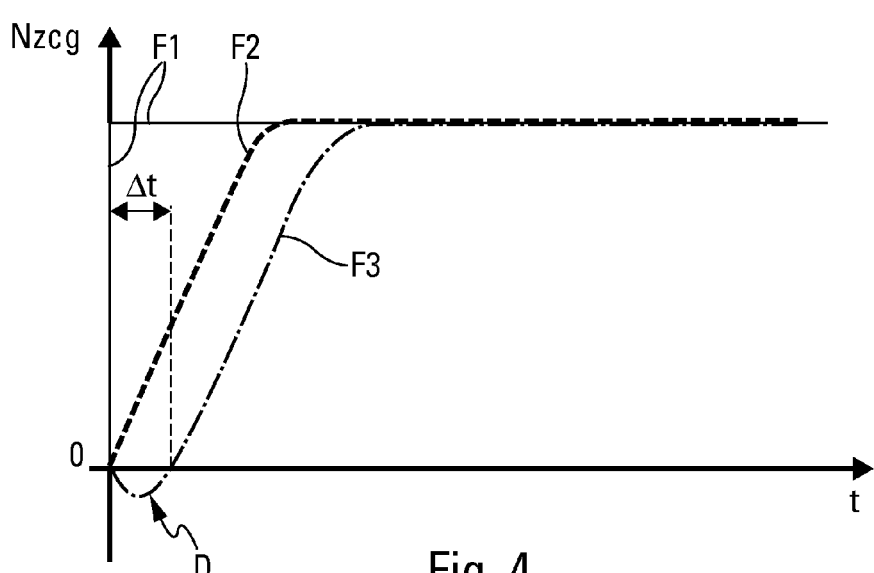
Fig. 4

METHOD AND SYSTEM FOR CONTROLLING THE FLIGHT OF AN AIRCRAFT

CROSS-REFERENCE TO RELATED APPLICATION

This application claims priority to French Patent Application No. 1457145, filed Jul. 24, 2014, which is incorporated herein by reference in its entirety.

TECHNICAL FIELD

The present embodiments relate to a method and a system for controlling the flight of an aircraft, in particular a transport aircraft. The present embodiments apply more particularly, although not exclusively, to controlling the flight of an aircraft refueled during in-flight refueling of that aircraft.

BACKGROUND

It is known that in-flight refueling, intended to transfer fuel from one aircraft in flight (called the refueling aircraft) to another aircraft in flight (called the refueled aircraft) is a very demanding task, in particular for the pilot or pilots of the refueled aircraft. This task requires precision, speed, and firmness. In particular, the pilot must adjust the position of the refueled aircraft with a precision of the order of 20 cm to be able to engage the in-flight refueling probe in the refueling drogue of the refueling aircraft.

A so-called vertical load factor control law C* (or C*U) is usually employed to control the pitch axis of an aircraft having an electrical flight control system. The main principle of this law C* is to convert a command from the pilot (via the control column) into a high-speed load factor command and into a low-speed load factor and pitch rate command. These commands are converted into deflection instructions for an elevator of the aircraft.

For a law C* of this usual kind, the increase in the lift of the aircraft is caused by an increase in the angle of attack of the aircraft which for its part is caused by the movement (or deflection) of the elevator.

Accordingly, at the start of the command, even if the commanded load factor is positive, the load factor measured at the center of gravity of the aircraft is negative. This phenomenon leads to a delay in the response of the aircraft and thus to a loss of precision and a loss of firmness during certain piloting phases, for example, during in-flight refueling.

SUMMARY

The present embodiments relate to an aircraft flight control method, the object of which is to overcome the above described disadvantages.

To this end, and in accordance with an embodiment, the method comprises at least the following successive steps: a) generating a load factor control value, this load factor control value being representative of manual actuation of a control column of the aircraft by a pilot of the aircraft; b) calculating at least one deflection instruction of at least one elevator of the aircraft from the load factor control value; and c) applying at least one calculated deflection instruction to the elevator so as to modify the angle of attack of the aircraft and its lift, step b) comprising: b1) dividing the load factor control value into a first value and a second value; b2) using the first value, calculating a deflection instruction of the elevator; and b3) using the second value, calculating at least one command instruction of at least one lift generator element of the aircraft, the lift generator element being able to modify the lift of the aircraft; and wherein step c) comprises sub-steps comprising: c1) applying the deflection instruction to the elevator; and c2) applying the command instruction to the at least one lift generator element, the first and second values being defined so that, when the corresponding deflection instruction and the corresponding command instruction are definitively applied to the elevator and to the at least one lift generator element, respectively, the latter generates the same aerodynamic position of the aircraft as if a deflection instruction determined from the whole of the load factor control value were applied only to the elevator.

Accordingly, the embodiment is commanded simultaneously, in addition to the elevator, at least one lift generator element, the direct effect of which on the lift of the aircraft is faster than that of the elevator and is virtually immediate, which makes it possible to eliminate the delay in the response of the aircraft and therefore to overcome the aforementioned disadvantage. Sub-step c2) advantageously comprises applying the command instruction, in symmetrical fashion, to at least one pair of lift generator elements arranged symmetrically with respect to a vertical plane of symmetry of the aircraft.

Moreover, the lift generator element is advantageously an aerodynamic surface that can be deflected in only one direction, and, prior to step c), this aerodynamic surface is subject to partial deflection, the command instruction being applied relative to this partial deflection.

The present embodiment also concerns an aircraft flight control system, the system comprising: a unit for generating a vertical load factor control value, the unit comprising a control column of the aircraft adapted to be actuated manually by a pilot of the aircraft, and means generating a load factor control value representative of the actuation of the control column; a calculation unit configured to calculate at least one deflection instruction of at least one elevator of the aircraft from a load factor control value; and at least one elevator associated with at least a first actuator, the first actuator being configured to apply a calculated deflection instruction to the elevator so as to modify the angle of attack of the aircraft and its lift.

In accordance with an embodiment: the calculation unit comprises: a first calculation system configured to divide the load factor control value into a first value and a second value; a second calculation system configured to calculate a deflection instruction of the elevator using the first value, this deflection instruction being applied to the elevator by the first actuator; and a third calculation system configured to calculate at least one command instruction of at least one lift generator element of the aircraft using the second value; and the system further comprises at least one lift generator element, the lift generator element being able to modify the lift of the aircraft and being associated with at least one second actuator, the second actuator being configured to apply the command instruction to the lift generator element, the first and second values being defined so that, when the corresponding deflection instruction and the corresponding command instruction are definitively applied to the elevator and to the at least one lift generator element, respectively, the latter generate the same aerodynamic position of the aircraft as if a deflection instruction determined from the whole of the load factor control value were applied only to the elevator.

The system advantageously includes at least one pair of lift generator elements arranged symmetrically with respect to a vertical plane of symmetry of the aircraft.

In a first embodiment, the at least one lift generator element is an aerodynamic surface of the aircraft adapted to modify the lift of the aircraft. The aerodynamic surface of the aircraft is preferably one of the following elements: a spoiler of the aircraft; an aileron of the aircraft.

Moreover, in a second embodiment, at least one lift generator element is a micro-thruster adapted to generate an action modifying the lift of the aircraft.

The present embodiments described herein further concern an aircraft, in particular a transport aircraft, that is provided with a system such as that specified hereinabove.

BRIEF DESCRIPTION OF THE DRAWINGS

The various embodiments will hereinafter be described in conjunction with the following drawing figures, wherein like numerals denote like elements, and:

FIG. 2A shows diagrammatically the actions generated on the aerodynamic position of an aircraft to which are respectively applied a system of the usual kind and a system according to the embodiment.

FIG. 2B shows diagrammatically the actions generated on the aerodynamic position of an aircraft to which are respectively applied a system of the usual kind and a system according to the embodiment.

FIG. 3A shows diagrammatically the actions generated on the aerodynamic position of an aircraft to which are respectively applied a system of the usual kind and a system according to the embodiment.

FIG. 3B shows diagrammatically the actions generated on the aerodynamic position of an aircraft to which are respectively applied a system of the usual kind and a system according to the embodiment.

FIG. 4 is a graph showing an effect obtained by implementing the embodiments described herein.

DETAILED DESCRIPTION

Figure 1:
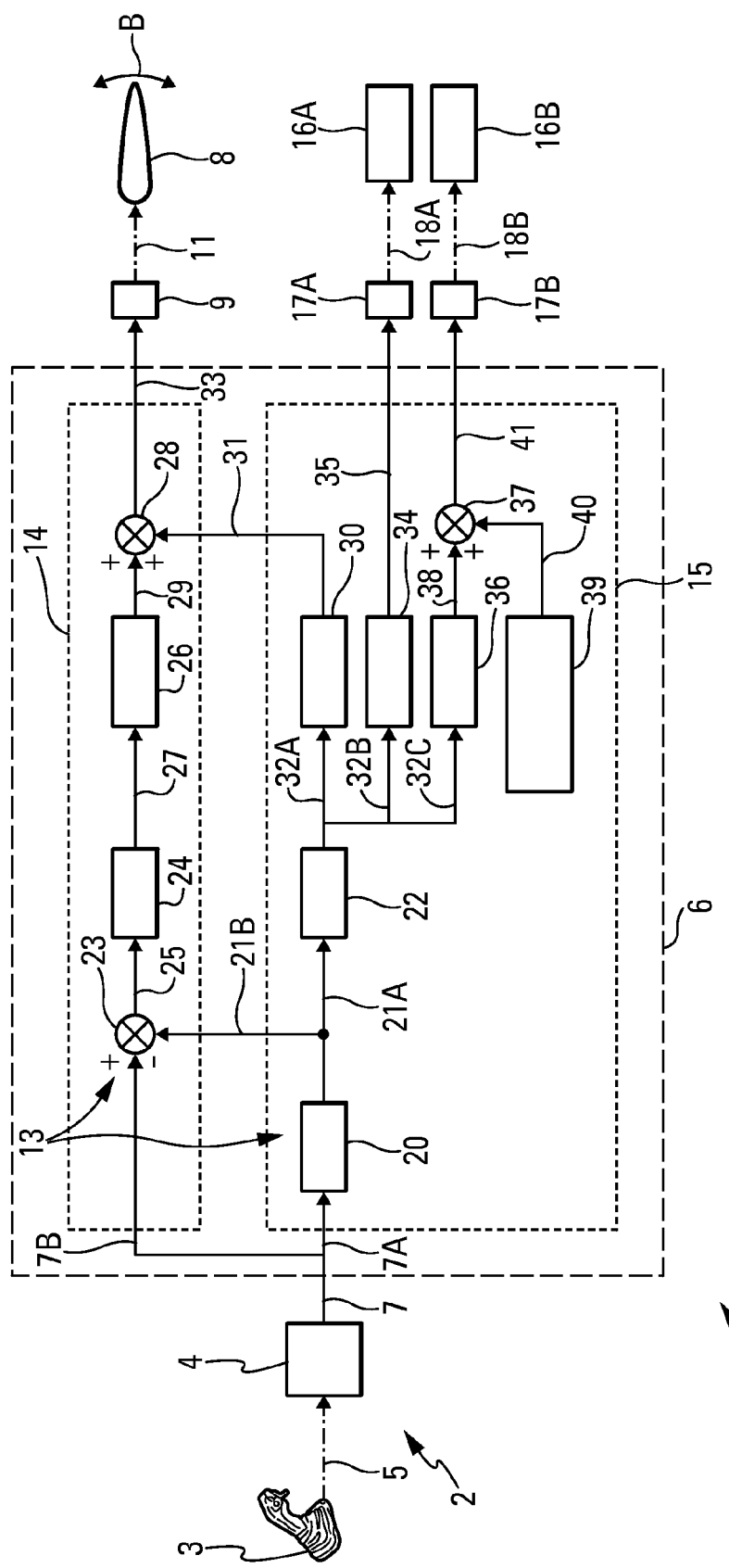
FIG. 1 is the block diagram of a system that illustrates a first embodiment.

The following detailed description is merely exemplary in nature and is not intended to limit the disclosed embodiments or the application and uses thereof. Furthermore, there is no intention to be bound by any theory presented in the preceding background detailed description.

The system 1 represented diagrammatically in FIG. 1 illustrates an embodiment of a flight control system of an aircraft AC, in particular a transport aircraft.

This embodiment applies more particularly, although not exclusively, to controlling the flight of an aircraft that is refueled from a refueling aircraft during in-flight refueling. Such in-flight refueling is a very demanding task, in particular for the pilots of the refueled aircraft, and requires precision, speed and firmness.

To this end, the system 1 includes: at least one unit 2 for generating a (vertical) load factor control value. The unit 2 comprises a control column (or member) 3 of the usual kind, notably a joystick, adapted to be actuated manually by a pilot of the aircraft, and means 4 of the usual kind automatically generating a load factor control value that is representative of the actuation of the control column 3 (as shown by a chain-dotted connection 5); a calculation unit 6 which is configured to calculate at least one deflection instruction of at least one elevator 8 of the aircraft AC from a load factor control value received from the means 4 via a connection 7; and at least one elevator 8 which is associated with at least one actuator 9 and which is adapted to be deflected as represented by a double-headed arrow B; the actuator 9 is configured in the usual way to act on the elevator 8 as shown by a chain-dotted connection 11 in order to apply to the elevator 8 a calculated deflection instruction so as to modify the angle of attack of the aircraft AC.

In the context of the present embodiment, the load factor concerned is a vertical load factor.

In accordance with an embodiment, the calculation unit 6 comprises: a calculation system 13 which is configured to divide the load factor control value received from the means 4 into a first value and a second value such that the sum of the first and second values is equal to the load factor control value; a calculation system 14 which is configured to calculate a deflection instruction of the elevator 8 in the usual way, using the first value; this deflection instruction is applied to the elevator 8 by the actuator 9 in the usual way; and a calculation system 15 which is configured to calculate a command instruction of at least one lift generator element 16A and 16B of the aircraft AC using the second value.

In the embodiment represented in FIG. 1, the calculation system 13 is integrated in part in the calculation system 14 and in part in the calculation system 15.

In accordance with the embodiment, the system 1 further comprises at least one and preferably a plurality of lift generator elements 16A and 16B. A lift generator element 16A and 16B is adapted to modify the lift of the aircraft AC and is associated with at least one actuator 17A and 17B to which a command instruction is transmitted. The actuator 17A, 17B is configured to apply the command instruction to the lift generator element 16A and 16B with which it is associated, as shown by a chain-dotted connection 18A and 18B.

The first and second values are defined so that when the corresponding deflection instruction and the corresponding command instruction are definitively applied to the elevator 8 and to the at least one lift generator element 16A and 16B, respectively, the latter generate the same aerodynamic position (or the same definitive aerodynamic response) of the aircraft AC as if a deflection instruction determined from the whole of the load factor control value were applied only to the elevator 8.

Accordingly, upon manual actuation of the control column 3 by the pilot, the system 1 (an electrical flight control system) simultaneously commands, in addition to the elevator 8, at least one lift generator element 16A and 16B, the direct effect of which on the lift is faster than that of the elevator 8 and is virtually immediate (or virtually instantaneous).

Consequently, to obtain a faster pitch response, the system 1 uses at least one lift generator element 16A and 16B, namely another available control surface or other means as specified hereinafter to create a virtually immediate lift, the efficacy of which is all the greater the closer this element is located to the center of gravity of the aircraft AC.

A specific flight control law used by the calculation system 15 is added in the calculation unit 6 to the law C* of the usual type used by the calculation system 14 (of the electrical flight control system). A constant part of the commanded load factor is obtained by a specific kinematic employing a (symmetrical) deflection of lift generator elements 16A and 16B, in particular ailerons and spoilers, which is proportional to the deflection of the elevator 8 to reduce the phase delay. This provides a virtually instantaneous lift contribution of limited amplitude.

This new law preserves a typical load factor behavior Nz whilst adding the advantages of a virtually instantaneous (short response time) lift. This enables an improvement of several hundred milliseconds in the longitudinal response time compared to a system of the usual kind. The system 1 is therefore more responsive, more precise and firmer than a system of the usual kind.

In the particular embodiment represented in FIG. 1, the calculation system 13 comprises: a limitation element 20 such as a limiter, which is integrated into the calculation system 15 and which limits the load factor control value received from the means 4 via a connection 7A (connected to the connection 7); the limited part (which corresponds to the aforementioned second value) is transmitted via a connection 21A to a filter element 22 of the calculation system 15; and a calculation element 23 which is integrated into the calculation system 14 and which subtracts this limited part, received via a connection 21B, from the load factor control value received from the means 4 via a connection 7B (connected to the connection 7).

Moreover, the calculation system 14 performs the usual calculations and to this end comprises: a filter element 24 which filters the value received from the calculation element 23 via a connection 25; a calculation element 26 which calculates a normal gain Kqn and applies it to the value received from the filter element 24 via a connection 27; a calculation element 28 which sums the result received from the calculation element 26 via a connection 29 and the result received from a calculation element 30 of the calculation system 15 via a connection 31. This calculation element 30 calculates a gain Kdqd and applies it to the value received from the filter element 22 via a connection 32A. The calculation element 28 sends the value obtained, which represents the deflection instruction, via a connection 33 to the actuator 9 for it to apply it to the elevator 8 in the usual way.

The purpose of the filtering by the filter element 22 is to optimize the specific control law implemented by the calculation system 15 in order to preserve a typical load factor behavior Nz. Moreover, the purpose of the filtering by the filter element 24 is to adjust the required behavior of the law Nz. Also, the limitation applied by the limitation element 20 is such that the specific direct lift command does not exceed a predetermined threshold.

Moreover, the calculation system 15 further comprises: a calculation element 34 which calculates a gain Kaild and applies it to the value received from the filter element 22 via a connection 32B; the calculation element 34 sends the value obtained, which represents a first command instruction, via a connection 35 to the actuator 17A for it to apply it to the at least one lift generator element 16A, for example to symmetrically arranged ailerons; a calculation element 36 which calculates a gain Kspd and applies it to the value received from the filter element 22 via a connection 32C; and a calculation element 37 which sums the value received via a connection 38 from the calculation element 36 and a value indicating a pre-deflection amplitude which is stored in a memory 39 and received via a connection 40; the calculation element 37 sends the value obtained, which represents a second command instruction, via a connection 41 to the actuator 17B for it to apply it to the at least one lift generator element 16B and preferably to at least one pair of lift generator elements, for example to symmetrically arranged spoilers.

As the spoilers 16B can be deflected only in the upward direction, partial pre-deflection is therefore imparted to these spoilers 16B so that they can be deflected in both directions with respect to this pre-deflected position in accordance with a direct lift law. The command instruction is then applied relative to this partial pre-deflection.

This latter feature may be applied to any lift generator element which can be deflected in only one direction.

Moreover, it will be noted that: the normal gain Kqn is a tabulated gain depending on flight parameters and is calculated in the usual way using a vertical load factor adjustment method of the usual kind; the gain Kdqd is used to compensate the fact that the spoilers and/or the ailerons are not located at the centre of gravity of the aircraft AC in order to return to a typical longitudinal behavior law Nz by eliminating longitudinal movements in terms of pitch and pitch rate; and the gains Kaild and Kspd are tabulated static gains depending on flight parameters and are calculated to obtain a direct and virtually instantaneous lift, generated by ailerons 16A and/or spoilers 16B, which is proportional to the commanded vertical load factor.

FIGS. 2A and 2B show the effect produced by a system of the usual kind that acts only on the elevator 8 of the aircraft AC. In FIG. 2A, an arrow P1 represents the lift that is caused by a modification of the angle of attack (shown by an arrow E1), which for its part is generated by an action of the elevator 8 (as shown by an arrow E2). In FIGS. 2A and 3A the aircraft AC is represented in dashed outline in the initial position and in solid outline in the position obtained after an action is applied.

The curve C1 of FIG. 2B shows in a highly diagrammatic fashion the corresponding evolution of the effect Nz on the load factor as a function of time t in the FIG. 2A example.

FIGS. 3A and 3B show the effect produced by the system 1 as described hereinabove which acts at the same time on lift generator elements 16A and 16B and on the elevator 8 of the aircraft AC. In FIG. 3A, an arrow P2 represents the lift that is generated by an action of the lift generator elements 16A and 16B (as shown by an arrow E3). The curve C2 of FIG. 3B shows in a highly diagrammatic fashion the corresponding evolution of the effect Nz on the load factor as a function of time t in the FIG. 3A example.

The main advantage obtained thanks to the aforementioned system 1 is highlighted in FIG. 4. To this end, there are represented in this FIG. 4, which is a diagram showing the evolution of the vertical load factor Nzcg as a function of time t: a curve F1 representing the load factor control value, as obtained from the means 4; a curve F2 representing the load factor for such a control value F1, as actually generated by the system 1 (and measured at the centre of gravity of the aircraft AC); and a curve F3 representing the commanded load factor for such a control value F1, as actually generated by a system of the usual kind, with at the start of the command, as shown by an arrow D, a load factor measured at the centre of gravity of the aircraft AC that is negative even though the commanded load factor F1 is positive.

Comparison of the curves F2 and F3 clearly highlights the elimination of the time delay Δt produced by the system 1.

A direct and virtually instantaneous lift is therefore produced by deflecting the lift generator elements (notably spoilers and ailerons) at the same time as indirectly increasing or decreasing the lift generated by deflecting the elevator 8. The general lift can therefore be increased directly without any modification of the angle of attack.

In a preferred embodiment, the system 1 includes one or more pairs of lift generator elements. The lift generator elements of each pair are arranged symmetrically with respect to a vertical plane of symmetry of the aircraft AC (passing through the longitudinal axis of the aircraft and notably representing an axis of symmetry of the wings of the aircraft). Moreover, the system 1 applies the command instruction symmetrically to the at least one pair of lift generator elements, that is to say identically on each side.

It will further be noted that the closer the lift generator elements used to generate a virtually instantaneous lift are to the centre of gravity of the aircraft AC, the greater the efficacy.

In a first embodiment, as mentioned above, each lift generator element 16A, 16B is an aerodynamic surface of the aircraft AC able to modify the lift of the aircraft AC. The aerodynamic surface of the aircraft AC is preferably one of the following elements: a spoiler of the usual kind of the aircraft AC, as is the case for the lift generator element 16B in FIG. 1; and an aileron of the usual kind of the aircraft AC, as is the case for the lift generator element 16A in FIG. 1.

Moreover, in a second embodiment, each lift generator element is a micro-thruster of RCS (reaction control system) type. Such a micro-thruster is based on an action/reaction principle and is adapted to generate an effect which modifies the lift of the aircraft AC, for example by emitting a jet of gas at high pressure.

In a third embodiment, the system 1 may include both lift generator elements conforming to the aforementioned first embodiment and lift generator elements conforming to the aforementioned second embodiment.

Consequently, the system 1 embodies specific manual flight control laws enabling piloting of the aircraft to be facilitated, in particular during in-flight refueling. The advantage of the system 1 may apply to each piloting task requiring precision, speed and firmness.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An automated method performed by a control system to control the amount of lift produced during flight of an aircraft in response to a control signal received in response to a manual activation of a control column of the aircraft by a pilot, wherein the aircraft comprises at least one elevator and at least one lift generator that directly modifies the amount of lift produced during flight and that is a separate control surface from the at least one elevator, the method comprising:
   extracting, by the control system, a limited portion of the control signal;
   generating, by the control system, at least one command instruction for the at least one lift generator of the aircraft based upon the limited portion of the control signal;
   calculating, by the control system, at least one deflection instruction of the at least one elevator of the aircraft from a remaining portion of the control signal that remains after the limited portion is extracted; and
   applying, by the control system, the at least one calculated deflection instruction to the elevator of the aircraft and the at least one command instruction to the at least one lift generator of the aircraft so as to modify the amount of lift produced during the flight of the aircraft in response to the control signal.

2. The method as claimed in claim 1,
   wherein the at least one lift generator comprises a pair of lift generator elements arranged symmetrically with respect to a vertical plane of symmetry of the aircraft, and wherein the applying comprises applying the at least one command instruction in symmetrical fashion to the pair of lift generator elements.

3. The method as claimed in claim 1,
   wherein the lift generator is an aerodynamic surface that can initially be deflected in only one direction, and that, prior to the generating, is subject to partial deflection, the command instruction being applied relative to this partial deflection.

4. The method of claim 1 wherein the extracting and generating are performed during in-flight refueling of the aircraft.

5. An aircraft flight control system to control an amount of lift produced during flight of an aircraft in response to a control signal received in response to a manual activation of a control column of the aircraft by a pilot, wherein the aircraft comprises at least one elevator and at least one lift generator that directly modifies the amount of lift produced during flight and that is a separate control surface from the at least one elevator, the control system comprising:
   a first calculation system configured to extract a limited portion of the control signal, to calculate at least one command instruction of the at least one lift generator of the aircraft based upon the limited portion of the control signal, and to provide the calculated at least one command instruction to thereby actuate the at least one lift generator; and
   a second calculation system configured to calculate a deflection instruction of the elevator using a remaining portion of the control signal that remains after the limited portion is extracted from the control signal, and to provide the deflection instruction to thereby actuate the at least one elevator;
   wherein, when the corresponding deflection instruction and the corresponding command instruction are applied to the elevator and to the at least one lift generator element, respectively, the amount of lift is produced during the flight of the aircraft in response to the control signal.

6. The system as claimed in claim 5,
   wherein the at least one lift generator comprises a pair of lift generator elements arranged symmetrically with respect to a vertical plane of symmetry of the aircraft.

7. The system as claimed in claim 5,
   wherein the at least one lift generator element is an aerodynamic surface of the aircraft adapted to modify the lift of the aircraft during in-flight refueling of the aircraft.

8. The system as claimed in claim 7,
   wherein the aerodynamic surface of the aircraft comprises at least one of:
   a spoiler of the aircraft; and
   an aileron of the aircraft.

9. The system as claimed in claim 5,
   wherein the at least one lift generator element comprises a micro-thruster adapted to generate an action modifying the lift of the aircraft.

10. The system as claimed in claim 5, wherein the at least one lift generator element of the aircraft comprises a spoiler, wherein the second calculation system comprises a memory that stores a pre-deflection amplitude of the spoiler, and wherein the second calculation system initially pre-deflects the spoiler to thereby allow subsequent deflection of the spoiler in two directions.

11. The system of claim 5 wherein the extracted portion of the command signal and the remaining portion of the command signal are defined so that, when the corresponding deflection instruction and the corresponding command instruction are applied to the at least one elevator and to the at least one lift generator element, respectively, a same amount of lift is generated as if a deflection instruction determined from the whole of the command signal were applied only to the at least one elevator.

12. An aircraft comprising:
   an elevator configured to respond to a first actuator to produce a first amount of lift during flight of the aircraft;
   a lift generator configured to respond to a second actuator to produce a second amount of lift during the flight of the aircraft using a separate control surface from the elevator;
   a control column that produces a control signal that indicates a total amount of lift to be produced in response to a manual activation of the control column by a pilot of the aircraft; and
   a control system coupling the control column to the first and second actuators to thereby actuate the elevator and the lift generator, respectively, in response to the control signal during flight of the aircraft, wherein the control system comprises:
      a first calculation system configured to calculate a command instruction based upon a limited portion of the control signal that is applied to the second actuator to actuate the lift generator and to thereby produce the second amount of lift during the flight of the aircraft; and
      a second calculation system configured to calculate an elevator deflection instruction using a remaining portion of the control signal that remains after the limited portion is extracted from the control signal that is applied to the first actuator to actuate the elevator and to thereby produce the first amount of lift during the flight of the aircraft.

13. The aircraft of claim 12 wherein the first calculation system is active during in-flight refueling of the aircraft to calculate the command instruction and to apply the command instruction to thereby actuate the lift generator during the in-flight refueling of the aircraft.

14. The aircraft of claim 12 wherein the lift generator comprises a pair of lift generator elements arranged symmetrically with respect to a vertical plane of symmetry of the aircraft.

15. The aircraft of claim 12 wherein the lift generator comprises a micro-thruster adapted to generate an action modifying the lift of the aircraft.

16. The aircraft of claim 12 wherein the lift generator comprises a spoiler of the aircraft.

17. The aircraft of claim 16 wherein the second calculation system initially pre-deflects the spoiler during mid-air refueling of the aircraft to thereby allow subsequent deflection of the spoiler in two directions.

18. The aircraft of claim 12 wherein the extracted portion of the command signal and the remaining portion of the command signal are defined so that when the corresponding deflection instruction and the corresponding command instruction are applied to the at least one elevator and to the at least one lift generator element, respectively, a same amount of lift is generated as if a deflection instruction determined from the whole of the command signal were applied only to the at least one elevator.

19. The aircraft of claim 12 wherein the second calculation system comprises a limiter configured to receive the command signal and to pass only the limited portion of the command signal.

20. The aircraft of claim 19 wherein the first calculation system receives the limited portion from the second calculation system and subtracts the limited portion from the command signal to calculate the remaining portion of the control signal.

* * * * *